United States Patent [19]

Strong

[11] Patent Number: 4,762,723
[45] Date of Patent: Aug. 9, 1988

[54] PROCESS FOR MAKING COEXTRUDED FILLED COOKIES

[75] Inventor: Dave R. Strong, Denville, N.J.

[73] Assignee: Nabisco Brands, Inc., Parsippany, N.J.

[21] Appl. No.: 877,799

[22] Filed: Jun. 24, 1986

[51] Int. Cl.⁴ .............................................. A23P 1/12
[52] U.S. Cl. ..................................... 426/283; 426/516
[58] Field of Search ................ 426/549, 94, 282, 283, 426/279, 280, 138, 284, 103, 448, 516

[56] References Cited

U.S. PATENT DOCUMENTS

| | | | |
|---|---|---|---|
| 3,541,946 | 11/1970 | Johnston | 425/133.1 |
| 3,615,147 | 10/1971 | Hayashi | 425/133.1 |
| 3,615,675 | 10/1971 | Fowler | 426/284 |
| 3,894,159 | 7/1975 | Fanta | 426/284 |
| 4,115,502 | 9/1978 | Rasmussen | 425/133.1 |
| 4,275,647 | 6/1981 | Chambers et al. | 426/94 |
| 4,283,430 | 8/1981 | Doster et al. | 426/284 |
| 4,469,475 | 9/1984 | Krysiak | 425/133.1 |
| 4,569,848 | 2/1986 | Giorgetti et al. | 426/103 |
| 4,643,904 | 2/1987 | Brewer et al. | 426/516 |
| 4,648,821 | 3/1987 | Thulin | 426/516 |
| 4,659,580 | 4/1987 | Svengren | 426/516 |
| 4,689,236 | 8/1987 | Pinto | 426/516 |

*Primary Examiner*—Donald E. Czaja
*Assistant Examiner*—Carolyn Paden
*Attorney, Agent, or Firm*—Richard Kornutik

[57] ABSTRACT

This invention includes a process for making a coextruded cookie having a high sugar content. The process includes the steps of mixing, feeding, coextruding, and machining an external casing composition of high sugar content and an internal filling composition of high sugar content.

9 Claims, No Drawings

PROCESS FOR MAKING COEXTRUDED FILLED COOKIES

BACKGROUND OF THE INVENTION

1. Field of the Invention

This invention relates to a process for making coextruded cookies. In particular, this invention relates to a process for making coextruded cookies having crisp external cookie-like casing compositions of a high sugar content and soft internal cream filling compositions of a high sugar content. This invention includes the product of this process.

2. Description Of The Prior Art

Extruders have been used in food technology for many years. A wide variety of food products can be formed by the use of extruder technology. Food products can be cooked during extrusion or extruded and then transferred to an oven and baked. Typically, extruded food products form a single mass of food material. When a product is "coextruded" an external casing of food material is simultaneously formed around an internal filling of a different food material. The coextruded product is a single mass of two types of food materials. The two food materials can have different densities and functions. Frequently, the internal filling is of a texture similar to that of the external casing. Very often, coextruded food products are not cooked during extrusion, but are formed and cooked during a separate step.

Extruded cookies having a soft internal filling are typically manufactured by a two step process. In the first step the external casing is extruded and is either cooked during extrusion or baked after extrusion. During the second step the external casing is filled with a filling or other composition. This process is a time consuming operation and requires much manipulation of the external casing pieces in order to fit the casings into filling apparatuses. This additional manipulation can cause excessive product breakage.

The coextrusion of a food product having two greatly different textures, one for the external casing and one for the internal filling, causes numerous problems. One problem often encountered in this situation occurs when the internal filling and external casing require different processing and/or cooking temperatures. Failure to satisfy this requirement can result in caramelization of one layer or the other before the entire food product is properly cooked. Another problem is encountered when the internal filling and external casing have different expansion rates. An over expansion of the internal filling can either create back-up of ingredients within the extruder or can cause the internal filling to leak out of the external casing when the food product is cut into distinct pieces.

U.S. Pat. No. 4,275,647 to Chambers et al. discloses an apparatus for producing a center filled food product. The casing composition disclosed for use with this apparatus is a mixture of mono and/or disaccharides, flour, shortening, egg whites, and water. The external casing is identified as having a "relatively high content of mono and/or disaccharides". The disaccharide content is between 15% and 45% and the flour content is between 10% and 20% by weight of the dough. The filling composition is between 25% and 50% sugar, between 10% and 40% fat, and between 10% and 40% non-fat dry milk solids by weight of the mix. The product of this invention is formed by a two step process. In the first step the apparatus performs cold extrusion of the casing composition which is baked as a flat sheet and rolled around its longitudinal axis to form a continuous tube. In the second step the filling composition is injected into the core of the continuous tube. The continuous tube is filled after the extruded flat sheet is rolled.

U.S. Pat. No. 4,469,475 to Krysiak discloses a machine for making encrusted food products. These food products can contain an internal filling which is coextruded into an external casing of dough. This apparatus is not a cooker coextruder in which the external casing and internal filling are cooked during the coextrusion process. Cooking is required as an additional step.

U.S. Pat. No. 3,541,946 to Johnston discloses an apparatus for continuously producing a center filled puffed cereal product. The apparatus of the disclosed invention is an extruder having a die head. The dough that forms the external casing of the center-filled puffed cereal product is compressed and heated by a rotating screw within the extruder. The compressed and heated dough expands as it exits the die head. A viscous fluid also under pressure is introduced to the extrusion die head through a feed pipe passing through the die head. The viscous fluid is simultaneously introduced to the interior of the expanding dough as the dough expands. The center-fill fluid does not flow through the extruder. This apparatus does not heat the center-fill fluid. This patent does not disclose an apparatus that cooks both the external casing and internal filling during the coextrusion process.

U.S. Pat. Nos. 4,115,502 to Rasmussen, 4,015,518 to Roth et al, and 3,615,147 to Hayashi all disclose apparatuses for extruding food products. The Roth and Hayashi references are particularly concerned with food products having an internal filling. These references disclose a process for producing uncooked food products. These references do not disclose a process for continuously coextruding cream filled cookies.

U.S. Pat. No. 4,416,910 to Hayashi et al. discloses an apparatus for continuously coextruding a center filled dough product. In this process the dough is filled with butter for use in an apparatus that flattens, stretches, and folds the dough to make multi-layered products such as pies, pastries and the like. This reference does not disclose a process for continuous coextrusion cooking.

The industry is lacking a coextruded cookie and a method for producing a coextruded cookie having a high sugar external casing and a soft internal filling.

SUMMARY OF THE INVENTION

This invention includes a coextruded cookie having a high sugar content and a crisp external cookie-like casing. The external casing contains between about 6% and about 20% sugar by weight. The coextruded cookie also has a soft internal sugar cream filling containing between about 50% and about 75% sugar by weight. The coextruded cookie is formed by continuous coextrusion cooking of a casing composition and a filling composition. The coextruded cookie can have a flattened tubular pipe-like shaped external casing that can be crimped at both ends.

Alternative embodiments of the invention can include a coextruded cookie having one or more of a variety of different granulations of sugar. Alternative embodiments of the invention can also include a coextruded cookie having a topping and/or coating.

Alternative embodiments of the invention can include an external casing having one or more of a variety of different flours, flavoring ingredients, and coloring agents.

This invention also includes a process for making a coextruded cookie having a high sugar content. The process involves mixing separately a casing composition containing between about 2% and about 35% sugar and a filling composition containing between about 50% and about 75% sugar by weight. Feeding of the casing composition into a cooker-extruder is performed by gravity. Feeding of the filling composition is performed under pressure by a pump. Coextruding is performed by a cooker-extruder having a die attached to the cooker, extruder barrel. During the simultaneous coextrusion of the external casing and the internal filling the casing composition provides a crisp external cookie-like casing and the filling composition provides a soft internal cream filling. The internal filling expands to fill the cavity in the external casing forming a coextruded product. Machining of the coextruded product is then performed to produce distinct coextruded cookie pieces.

This invention can include further steps of chilling, drying and packaging the coextruded cookie pieces to maintain a desired moisture content.

DETAILED DESCRIPTION OF THE INVENTION

This invention includes a coextruded cookie of a high sugar content having a crisp external cookie-like casing hereinafter referred to as the "external casing" and a soft internal cream filling hereinafter referred to as the "internal filling". The external casing contains primarily flour and sugar and the internal filling contains primarily fat and sugar. The coextruded cookie is formed by continuous coextrusion cooking. The coextruded cookie has a crisp external cookie-like casing with a tubular shape that can be flattened, creased, crimped at both ends, or otherwise molded. The casing composition can contain one or more of a variety of different flours, flavoring ingredients and coloring agents. The coextruded cookie can contain one or more of a variety of different granulations of sugar. Desirable embodiments can include a coextruded cookie having a topping and/or coating.

The present invention also includes a process for producing a coextruded cookie of a high sugar content. In this process, the casing composition and the filling composition are transformed into coextruded cookie pieces by the steps of mixing, feeding, coextruding, and machining. The coextruded cookie pieces can be cooled on a conveyor belt and can be further dried to a desired moisture content sufficient to harden the crisp external cookie-like casing. This invention also includes the product of the process.

The coextruded cookie of the present invention includes a high sugar content having a crisp external cookie-like casing and a soft internal cream filling. The coextruded cookie is formed by continuous coextrusion cooking whereby the external casing is extruded and simultaneously filled with extruded cream filling. The external casing has a sugar content between about 6% and about 20% by weight. The internal filling has a sugar content between about 50% and about 75% by weight.

A variety of sugars can be used in the present invention. Sugar effects the texture, appearance and flavor of the coextruded cookie. The type and quantity of sugar employed effects the extrusion properties of the external casing. Powdered sucrose possesses acceptable economic and product quality attributes for the practice of the present invention. A sugar having a granulation at least as fine as 10X is chosen for use in the preferred embodiment.

This invention can include any commonly known cookie size. The coextruded cookie is typically of hand held size capable of being consumed in a few bites. The preferred embodiment produces a coextruded cookie approximately 6 centimeters long, 2.5 centimeters wide and 1.5 centimeters high. The coextruded cookie of the preferred embodiment has a flattened tubular shape that can be crimped at both ends. The coextruded cookie resembles a filled cylinder such as a tube or pipe that has been slightly flattened. The external casing forms a tubular shell about the internal filling.

The external casing produced by continuous coextrusion cooking has fine uniform cells. The external casing also has a hard, rigid, crisp, cookie-like texture. An external casing of fine uniform cells having a hard, crisp texture makes a snapping or crunching sound when cracked or crushed. The external casing is capable of being crushed by hand into a powder.

The casing composition contains less than about 94% primary flour. The preferred embodiment is a mixture of primary and secondary flours. The primary flour in the mixture is a wheat flour of medium gluten strength possessing extrusion properties suitable for automatic processing. Secondary flours can be added to the primary flour to enhance flavor or texture qualities of the external casing. A secondary flour can be any flour including those flours milled from grains which are members selected from the group consisting of corn, rice, white rye, oat, barley, graham, and mixtures of these.

The casing composition is prepared as a dry powder which constitutes numerous ingredients in various proportions. In the preferred embodiment finely granulated sugar is present in the casing composition from between about 2% and about 35% by weight. The casing composition in the preferred embodiment also includes approximately 1% salt for flavoring and 1% non-fat dry milk for use as a binder. The casing composition that is prepared as a dry powder is then mixed during the extrusion process with between about 6% to about 8% water within the extruder barrels to produce a uniform homogeneous dough-like material.

Alternative embodiments of the casing composition can include secondary flours and other ingredients. A secondary flour can be any flour including those which are selected from a group consisting of corn, rice, white rye, oat, barley, graham, and mixtures of these. Additionally, flavoring ingredients and coloring agents can be used to alter the flavor and appearance of the external casing. Small flavored particles such as nuts can be included in the casing composition.

The soft internal cream filling produced by continuous coextrusion cooking has a pliable texture is creamy and melts in the mouth. The cream filling tastes sweet and melts when coming in contact with the body heat of the consumer's tongue.

The filling composition of this invention can include any standard composition for filling cookies that can be pumped and which "sets-up" or solidifies after coextrusion. Generally, these compositions are "sugar cream fillings" that are approximately two-thirds sugar mixed with one-third fat by weight. The fat can be a suitable oil such as a member selected from the group consisting of coconut, soybean, cottonseed, palm kernel oils and mixtures of these. Sugar cream fillings typically have no dairy cream present in their composition.

The filling composition must be pumpable through standard commercial equipment while having a texture thick enough to prevent running of the internal filling after coextrusion. Oil absorbing material such as microcrystalline dextrose, whey, and milk powders, and lipophilic materials such as soy proteins and starches can be employed to alleviate this problem. Emulsifiers such as lecithin and glycerol, lactoesters of fatty acids can also be included to stabilize the filling composition.

Alternative embodiments of the filling composition can include one or more of a variety of different flavoring ingredients, coloring agents, granulations of sugar, binders and emulsifiers. Acceptable flavoring ingredients for use in both the filling composition and the casing composition can include natural or artificial flavors such as chocolate, banana, strawberry, coffee, vanilla, and other fruit flavors. Coloring agents can vary according to the art.

Alternative embodiments of the coextruded cookie can include coating or topping the coextruded cookie piece with chocolate or fruit flavored icings.

The present invention also includes a process for making coextruded cookie of a high sugar content including the steps of mixing, feeding, coextruding and machining. This process produces a coextruded cookie with a casing composition having a sugar content between about 2% and about 35% and a filling composition having a sugar content between about 50% and about 75%. More desirably, the sugar contents are between about 6% and about 20% for the casing composition and between about 60% and about 70% for the filling composition. In addition to sugar, the casing composition can include flour, water, salt, non-fat dry milk, flavoring ingredients, bicarbonates, and coloring agents. In addition to sugar the filling composition can include fat, flavoring ingredients, coloring agents, binders, and emulsifiers.

Coextrusion is a process whereby two food materials are extruded at the same time. In the present invention an external casing of food material is simultaneously formed around an internal filling of a different food material. A single product of two food materials, one an external casing, the other an internal filling, is continuously produced. The coextruded product is a single mass of two food materials. The two food materials can have different densities.

Continuous extrusion cooking is a process whereby the external casing composition is cooked within an extruder and exits the extruder in a continuous fashion fully cooked. In the present invention, the coextruded cookie has a composition which, when fully cooked in the extruder, forms an external casing. The external casing is formed and simultaneously filled with the internal filling such that the resultant coextruded cookie requires no further cooking.

The mixing of the dry ingredients of the casing composition can be performed by an conventional means for mixing. Acceptable mixers for the casing composition ingredients include ribbon blenders and V-blenders. Typically, the casing composition is placed after mixing in a hopper positioned so as to be gravity fed to the cooker-extruder. The mixing of the ingredients of the filling compositionn can also be performed by any conventional means for mixing. Acceptable mixers for the filling composition include any blender based on propeller-in-tank concepts. In the preferred embodiment the filling composition is placed after mixing in hopper which is connected to a high-pressure worm screw feed pump.

An example of a suitable pump to supply the filling composition to the extruder is that produced by the Robins and Myers Corporation of Springfield, Ohio. Their pumps, known as Moyno ® pumps, have variable drive, augar-like worm screws which provide a regulated rate of feed for the filling composition to the cooker-extruder die plate. These pumps supply the filling composition to about 40 to about 80 pounds per square inch pressure or higher. The flow rates of the casing and filling compositions from both hoppers can be selectively regulated so as to feed the cooker coextruder in a proportion sufficient for production of the desired product.

The practive of the process according to this invention utilizes a cooker-extruder. Cooker-extruders are commercially available from numerous sources. This invention is not limited to a particular brand of cooker-extruder. A desirable cooker-extruder for the practice of the process of this invention is a twin screw cooker extruder manufactured by the CL-Simon Corporation of 2955 Fairfax Road, Kansas City, Kans. 66115. This cooker extruder has "twin" or two screws. The screws can be assembled in numerous combinations of elements to produce different amounts of compression and rates of flow of the ingredients within the extruder barrel. The screws are located within the barrel of this cooker extruder. In the preferred embodiment a CL-Simon cooker-extruder having a 1000 centimeter barrel is used. In the present invention the casing compositions are forced through the barrel where the ingredients are separately mixed, compressed, and cooked. The casing and filling compositions exit a die head fastened to the end of the barrel as a single coextruded product. The shape of the fully cooked coextruded product is determined by the configuration of the die head nozzle.

A screw assembly is utilized in the barrel of the cooker-extruder that permits a residence time within the cooker-extruder barrel sufficient for cooking or gelatinizing the starch of the casing composition. The residence time is defined as the duration that a food particle remains in the cooker-extruder barrel. The residence time required for a particular product varies according to the specific formulas of the composition being coextruded and the desired characteristics to be obtained in the coextruded product. For example, to correct undercooking of a coextruded product requires the use of a screw assembly combination that provides a longer residence time. Alternatively, to correct excessive carmelization of the sugar of a coextruder product requires the use of a screw assembly combination that provides a shorter residence time.

Screw assemblies for cooker-extruders are desirably arranged to compensate for variables encountered with different composition formulas and other factors. Variables that can require compensation by altering a screw assembly arrangement include the length of the cooker-extruder barrel, the moisture content of the various compositions, the operational revolutions per minutes of the screws, the barrel cooking and cooling temperatures and the density of the compositions. Variations of the screw assemblies are to compensate for these variables. The screw assemblies of the cooker extruder used in the preferred embodiment are mounted on co-rotating shafts instead of counter rotating shafts. Co-rotating shafts rotate in the same direction. Counter rotating shafts rotate in opposite directions from each other. In addition to the screw assembly combination, the speed of rotation of the screws varies (1) the rates of feed of the compositions to the nozzle and (2) the pressures obtained within the barrel. The amount of residence time required to cook the coextruded product is also determined by the bulk density of the composition being cooked. The greater the bulk density of the composition, the longer the residence time required in the cooker-extruder. The manufacturer of cooker-extruders can selectively assemble the screw assembly to meet the needs of one practicing the invention. Manufacturers provide assistance in chosing a screw assembly combination to the users of cooker-extruders.

The casing composition is cooker within the temperature regulated barrel of the cooker-extruder. In the preferred embodiment, using the CL-Simon cooker-extruder, water from a controllable pumping device is injected at a first point into the internal barrel of the cooker-extruder at approximately 21° C. (70° F.) to solubilize the dry mix ingredients such as sugar, protein, starch, and flour, to lubricate the dry mix in the barrel, and to facilitate heat transfer to the dry mix. Water is also introduced at a second point into the jacket of the barrel, usually at normal water tap pressure, to regulate the barrel processing temperature. The flow of the water in the jacket of the barrel can be regulated at the front and rear section of the barrel. Cooling sections and induction heater sections are mounted on the exterior of the barrel of this cooker-extruder. In the CL-Simon cooker-extruder, a water cooled section is closest to the entry for the casing composition to the barrel. This cooling section is followed by an induction heater, a second water cooling section, and a second induction heater next to the exit point of the barrel of the cooker-extruder. In the present process induction heaters are typically heated to between about 150° C. (302° F.) and about 160° C. (320° F.).

The cooking of the casing composition can be controlled by selectively regulating the temperatures of the cooling sections and induction heaters. In the preferred embodiment the casing composition is cooked at a temperature of 150° C.

The filling composition is separately heated in a kettle and held at near the melting point or solidification temperature that melts the fats and allows the filling to flow. This temperature is usually between about 35° C. (95° F.) and about 38° C. (100° F.). Temperatures vary with different compositions. Too high a temperature can lead to undesirable running of the internal filling and migration of the fats of the internal filling into the external casing. A temperature of 35° C. to 38° C. yields desirable results with the filling compositions described above. The filling is not cooked in the extruder barrel at any point. It is heated substantially at the extruder head as a result of heat conduction as the filling passes through the passages of the die mechanism.

The solid fat index (SFI) of a filling composition is defined as the percent solid fat of a sample of oil at a particular temperature. The higher the solid fat index of the filling composition the better that filling composition withstands the temperatures of coextrusion. In the preferred embodiment, the solid fat index of the filling composition ranges from between about 27% and about 32% at extrusion temperatures.

The concentration of sugar in the casing composition controls the texture and density of the external casing during coextrusion. The more sugar present in the casing composition, the more dense is the external casing of the final product. Too much sugar limits puffing or expansion of the external casing during coextrusion. Too little sugar causes over expansion and produces an external casing that is both dry and sticky. A coextruded cookie having a dry, sticky external casing possesses poor eating qualities such as molar compaction during chewing. These adverse eating qualities can be somewhat mitigated by spraying oil on the surface of the external casing.

The rate of flow of the casing composition is different from that of the filling composition. In this invention at equal weights the expansion of the external casing is greater than that of the internal filling. The internal filling expands to fill the cavity of the external casing. The internal filling has more density and less expansion rate than the external casing. The external filling must, therefore, be fed into the cavity of the external casing at a slower rate than the rate of exit of the external casing from the cooker-extruder. Variations of the casing or filling compositions can require an adjustment of the screw assemblies to insure that the rate of flow of the casing and filling compositions produces a complimentary flow. The product of this invention when prepared with the CL-Simons cooker-extruder is most desirable when the CL-Simons cooker-extruder extrudes at the rate of approximately 180 kilograms (400 pounds) per hour of external casing and approximately 180 kilograms (400 pounds) per hour of internal filling.

Numerous dies can be attached to the extruder barrel to form different shapes and thicknesses of the coextruded products. The nozzles on these dies vary greatly and can be custom made or commercially purchased to meet the needs and desires of one practicing this invention. The die used in the preferred embodiment has two concentric ring tubes. The interior diameter of the outer concentric ring is 6.35 millimeters or one-quarter inch. The outer diameter of the inner concentric ring is 4.76 millimeters or three-sixteenth of an inch. The inner diameter of the inner concentric ring is 3.175 millimeters or one-eight of an inch. The external casing is continuously extruded through the "O" shaped hole formed by the outer diameter of the inner tube and the inner diameter of the outer tube. The internal filling is continuously extruded through the cavity of the inner tube. In the preferred embodiment the external casing exits the die and is simultaneously filled by the internal filling. The external casing exits the die having a tubular pipe-like shape and the internal filling expands to fill the space within the external casing. The process of the present invention produces by continuous coextrusion cooking a coextruded product having a filled tubular pipe-like shape. This coextruded product is continuous and resembles a filled cylinder. The process of this invention includes a further step of machining this coextruded product into pieces. The filled tubular pipe-like shaped product produced in the preferred embodiment of this invention has an external diameter of approximately 25.4 millimeters or one inch. Numerous variations of nozzle designs can be used and are not limiting on this invention. Dies can be used with circular, rectangular, triangular, or nozzle exit ports that extrude the external casing into corresponding geometric shapes.

The extrusion pressure and moisture content of the coextruded product effects the external casing texture.

In the preferred embodiment the cooker-extruder extrudes the external casing through the selected die at a pressure of about up to 80 pounds per square inch. The internal filling is pumped through the selected die at a pressure of up to 80 pounds per square inch. The moisture content of the external casing immediately after exiting the cooker-extruder is between about 5% and about 8% and the moisture content of the internal filling is between about 3% and about 5%.

Upon exiting the cooker-extruder, the coextruded product has a filled tubular pipe-like shape. The filled tubular pipe-like shaped product is machined into distinct cookie pieces. Various cutting mechanisms, referred to as "post-forming devices", can be used to cut and/or crimp the coextruded product. One such post-forming device has a roller having pockets or indentations that can be used to continuously crimp the coextruded product and form distinct cookie pieces at the same time it pinches the ends of the pieces. This crimping prevents the internal filling from running out of the external casing. This post-forming device can partially flatten the filled tubular pipe-like shaped product into an oval or flattened tubular shape. Another post-forming device is an apparatus having horizontally mounted rollers feeding the coextruded product to a converging fly cutter section where the coextruded product is cut without being crimped.

As an alternative to crimping, the cut cookie pieces can be carried on a conveyor belt or similar means to a post extrusion chilling device. The post extrusion chilling device passes cold air over the cookie pieces to solidify the internal filling within the external casing. This alternative enables the cookie pieces to be dried without melting the internal filling.

A moisture content between about 5% and about 8% of the coextruded external casing requires further drying to make the final product crisp. The drying can be done on a conveyor belt which passes the coextruded cookie pieces through an oven. In the preferred embodiment a conventional forced hot air drying oven is set between about 121° C. (250° F.) for about 15 minutes and about 177° C. (350° F.) for about 5 minutes. A final moisture content between about 2% and about 5% for the external casing and between about 1% and about 3% for the internal filling are obtained.

The coextruded cookie pieces can be packaged after drying. Packaging is best accomplished when a moisture or vapor proof packaging material is used. In this manner, the coextruded cookie pieces maintain their freshness and crispness.

The following examples are used to further illustrate the embodiments of this invention.

EXAMPLE I

This example is the preferred embodiment of this invention and yields a flattened tubular pipe-like shaped coextruded cookie having a soft internal cream filling and a crisp external cookie-like casing. The casing and filling compositions are prepared from the following ingredients:

TABLE I

| CASING COMPOSITION | | |
|---|---|---|
| Ingredients | Pounds | Ounces |
| White rye flour | 45.0 | 0.0 |
| Medium wheat flour | 229.0 | 8.0 |
| Sugar 10× | 18.0 | 0.0 |
| Non-fat dry milk | 3.0 | 0.0 |

TABLE I-continued

| CASING COMPOSITION | | |
|---|---|---|
| Ingredients | Pounds | Ounces |
| Water | 18.0 | 0.0 |

TABLE II

| FILLING COMPOSITION | |
|---|---|
| Ingredients | Percent |
| Sugar 10× | 60.0% |
| Soybean oil | 40.0% |

The casing composition and the filling composition are mixed separately to obtain homogeneous mixtures suitable for coextrusion. The dry casing composition is blended in a ribbon blender. The filling composition is mixed using a jacketed kettle equipped with a scrape agitator with the mix blades set at 40 rpm. The filler composition is warmed to 35° C. (95° F.) and held at that temperature for 20 minutes. The dry casing composition and filling compositions are placed in separate hoppers. The casing composition is gravity fed into the coextruder and the filling composition is fed at a pressure of 80 pounds per square inch into the coextruder die plate by a Moyno ® pump. A twin screw cooker-extruder from the CL-Simon Corporation of Kansas City, Kans. is used. The casing composition is cooked at a temperature of 150° C. The speed of rotation of the screws is 220 rpm. This obtains an exit pressure of 100 pounds per square inch. The product is extruded at a rate of approximately 400 pounds per hour of external casing and approximately 400 pounds per hour of internal filling. The moisture content of the coextruded external casing is 5.5% and the coextruded internal filling 7.5%.

A circular die is used which produces a coextruded product having a tubular pipe-like external casing. The external casing is one inch in its external diameter and one and half inch in its internal diameter. The one half inch diameter internal cavity of the external casing is filled substantially completely with the coextruded cream filling. As the filled tubular pipe-like shaped product exits the cooker-extruder it is flatened by a "post forming device" having horizontally mounted rollers and then transported on a conveyor belt into the cooling apparatus where cool air passes about the coextruded extrudate for about 15 to about 30 seconds. As the coextruded extrudate cools, the casing becomes slightly firm and the internal cream filling starts to solidfy. This step aids in cutting the external casing and aids in preventing the internal filling from leaking out of the coextruded cookie. As the flattened coated coextruded extruded leaves the cooling apparatus it is fed into a conveying fly cutter and cut into about 3 foot sections. These sections are transported to a conventional convection oven.

The coextruded product is transported on a conveyor belt into the chilling apparatus where chilled air passes about the cookie pieces for about 15 to about 30 seconds and solidifies the soft internal cream filling. This step prevents the internal filling from leaking out of the external casing.

The conveyor transports the chilled coextruded product into a conventional convection oven. The product is dried at 295° F. for 9 minutes to reduce the moisture content to 3% for the external casing and 2.5% for the internal filling. After drying, the coextruded product is cut into flattened tubular pipe-like shaped cookie pieces by a circular cutter applying a downward force.

The coextruded cookie pieces are approximately 6 centimeters in length, 2.5 centimeters in width and 1.5 centimeters in height. The conveyor belt then transports the coextruded cookie pieces to a packaging apparatus. The coextruded cookies have approximately 6% sugar in the external casing and 60% sugar in the internal filling.

EXAMPLE II

This example produces a coextruded cookie having a rectangular shape. The external casing is flavored to taste like vanilla and the ends of the rectangular coextruded cookie pieces are slightly crimped. The casing and filling compositions are prepared from the following ingredients:

TABLE III

| CASING COMPOSITION | | |
|---|---|---|
| Ingredients | Pounds | Ounces |
| Medium wheat flour | 270.0 | 0.0 |
| Sugar 4× | 23.0 | 8.0 |
| Salt | 4.0 | 8.0 |
| Non-fat dry milk | 3.0 | 0.0 |
| Vanilla flavoring | 0.0 | 8.0 |
| Water | 20.0 | 0.0 |

TABLE IV

| FILLING COMPOSITION | |
|---|---|
| Ingredients | Percent |
| Sugar 6× | 60.0% |
| Soybean oil | 37.0% |
| Vanilla flavoring | 3.0% |

The process to produce this coextruded cookie is the same as that used in Example I except that a chilling step is not performed. A die having a rectangular shaped nozzle is used to coextrude the external casing with the internal filling. This product has about 8% sugar by weight in the external casing. The external casing is cooked at a temperature of 160° C. while the internal filling is cooked at a temperature of 100° F. The screw speed of the cooker coextruder is set at 300 rpm. Upon exiting the cooker-extruder a post-forming device having horizontally mounted rollers with raised edges slightly crimps the ends and severs the coextruded product into distinct cookie pieces. The post-forming device also has vertically mounted rollers to square off the external casing. Crimping of the coextruded cookie piece prevents the internal filling from leaking out of the external casing.

EXAMPLE III

This example produces a square shaped coextruded cookie of a high sugar content having a crisp external cookie-like casing and a soft internal cream filling. The ends of the square shaped external casing are slightly crimped. The casing and filling compositions are prepared from the following ingredients:

TABLE V

| CASING COMPOSITION | | |
|---|---|---|
| Ingredients | Pounds | Ounces |
| White rye flour | 33.0 | 0.0 |
| Medium wheat flour | 229.0 | 8.0 |

TABLE V-continued

| CASING COMPOSITION | | |
|---|---|---|
| Ingredients | Pounds | Ounces |
| Sugar 4× | 30.0 | 0.0 |
| Salt | 4.0 | 8.0 |
| Non-fat dry milk | 3.0 | 0.0 |
| Water | 22.0 | 0.0 |

TABLE VI

| FILLING COMPOSITION | |
|---|---|
| Ingredients | Percent |
| Sugar 10× | 66.5% |
| Palm kernel oil | 33.5% |

The process to produce this coextruded cookie is the same as that used in Example I except that a final drying step is not performed and the external casing is slightly crimped. A die having a square shaped nozzle is used to coextrude the external casing with the internal filling. This product has an external casing having a sugar content of about 10% and an internal filling having a sugar content of about 67%. The external casing is cooked at a temperature of 155° C. and the internal filling is cooked at a temperature of 97.5° F. The screw speed of the cooker-extruder is set at 260 rpm. Upon exiting the cooker-extruder a post-forming device having horizontally mounted rollers with raised edges slightly crimp and severs the ends of the coextruded product into distinct square shaped cookie pieces.

EXAMPLE IV

This example produces a coextruded cookie having a flattened tubular shape. The soft internal cream filling is flavored to taste like strawberry. The casing and filling compositions are prepared from the following ingredients:

TABLE VII

| CASING COMPOSITION | | |
|---|---|---|
| Ingredients | Pounds | Ounces |
| Medium wheat flour | 49.0 | 3.0 |
| Sugar 10× | 20.0 | 0.0 |
| Rice flour | 13.0 | 0.0 |
| Corn meal | 10.0 | 0.0 |
| Ethyl vanillin | 0.0 | 1.0 |
| Salt | 0.0 | 12.5 |
| Whey | 5.0 | 0.0 |
| Citric acid | 0.0 | 8.0 |
| Sodium citrate | 0.0 | 4.0 |

TABLE VIII

| FILLING COMPOSITION | |
|---|---|
| Ingredients | Percent |
| Sugar 4× | 60.0% |
| Soybean oil | 30.0% |
| Coconut oil | 7.0% |
| Strawberry flavoring | 3.0% |

The process used to produce this coextruded cookie is the same as that used in Example I. This example produces a coextruded cookie having an external casing sugar content of about 20%. This example also illustrates an external casing having about 62% flour.

EXAMPLE V

This example produces a coextruded cookie having a low calorie content. The external casing is flavored to taste like chocolate. The casing and filling compositions are prepared from the following ingredients:

TABLE IX

| CASING COMPOSITION | | | |
|---|---|---|---|
| Ingredients | Percent | Pounds | Ounces |
| Medium wheat flour | 55.76% | 113.0 | 10.0 |
| Sugar 6× | 6.0% | 12.0 | 0.0 |
| Rice flour | 15.0% | 30.0 | 0.0 |
| Corn meal | 15.0% | 30.0 | 0.0 |
| Ethyl vanillin | .04% | 0.0 | 1.0 |
| Salt | .5% | 1.0 | 0.0 |
| Whey | 3.0% | 6.0 | 0.0 |
| Cinnamon | .3% | 0.0 | 10.0 |
| Baking soda | .2% | 0.0 | 6.0 |
| Ammonia | .2% | 0.0 | 6.0 |
| Cocoa | 4.0% | 8.0 | 0.0 |

TABLE X

| FILLING COMPOSITION | |
|---|---|
| Ingredients | Percent |
| Cottonseed oil | 26.0% |
| Sugar 10× | 33.0% |
| Aspartame | .2% |
| Vanillin | .04% |
| Starch | 21.0% |
| Polydextrose | 11.36% |
| Baking soda | .4% |
| Calcium sulfate | 6.0% |
| Salt | 1.0% |
| Propylene glycol | 1.0% |

The process used to produce this coextruded cookie having a low calorie content is the same as that used in Example I. The sugar content of the external casing is about 6% and the sugar content of the internal filling is about 35%. This example illustrates an external casing having about 70% flour.

EXAMPLE VI

This example produces a coextruded cookie. The external casing is flavored to taste like chocolate. The casing and filling compositions are prepared from the following ingredients:

TABLE XI

| CASING COMPOSITION | |
|---|---|
| Ingredient | Percent |
| Medium wheat flour | 42.0% |
| Sugar 6× | 20.0% |
| Rice flour | 15.0% |
| Corn meal | 13.0% |
| Cocoa powder | 4.0% |
| Sweet whey solid | 3.0% |
| Corn flour | 2.0% |
| Salt | .5% |
| Finely ground cinnamon | .27% |
| Sodium bicarbonate | .19% |
| Ethyl vanillin | .04% |

TABLE XII

| FILLING COMPOSITION | | | |
|---|---|---|---|
| Ingredient | Percent | Pounds | Ounces |
| Sugar 6× | 65.76% | 114.0 | 3.0 |
| Fat | 32.37% | 56.0 | 11.0 |
| Whey | 1.73% | 3.0 | 13.0 |
| Ethyl vanillin | 0.05% | 0.0 | 1.33 |
| Lecithin | 0.09% | 0.0 | 2.5 |

The process used to produce this coextruded cookie is the same as that used in Example I. This example illustrates an external casing having about 60% flour.

What is claimed is:

1. A process for making a coextruded cookie, comprising:
    (a) mixing separately:
        (i) a casing composition having a sugar content between about 2% and about 35% and
        (ii) a filling composition having a sugar content between about 50% and about 75%;
    (b) feeding simultaneously said casing composition into a twin screw cooker-extruder and said filling composition to an extruder die plate;
    (c) coextruding simultaneously through said die plate attached to a cooker-extruder barrel, a crisp external cookie-like casing by continuous extrusion cooking of said casing composition and a soft internal cream filling by continuous extrusion of said filling composition whereby a coextruded product is formed; and
    (d) machining said coextruded product into pieces.

2. A process for making a coextruded cookie according to claim 1, wherein said coextruding of said casing occurs at a temperature between about 140° C. and about 190° C.

3. A process for making a coextruded cookie according to claim 2, wherein said coextruding of said filling occurs at a temperature above a melting point of the composition and below a temperature between about 90° F. and about 100° F.

4. A process for making a coextruded cookie according to claim 1, wherein said coextruding forms a coextruded product having a filled tubular pipe-like shape.

5. A process for making a coextruded cookie according to claim 4, wherein said machining includes flattening and cutting said coextruded product to form oval tubular shaped pieces.

6. A process for making a coextruded cookie according to claim 5, wherein said machining crimps said oval tubular shaped pieces enabling said filling to remain within said casing.

7. A process for making a coextruded cookie according to claim 4, further comprising solidifying said filling by chilling said crimped oval tubular shaped pieces.

8. A process for making a coextruded cookie according to claim 7, further comprising drying said chilled tubular shaped pieces.

9. A process for making a coextruded cookie, comprising:
    (a) mixing separately:
        (i) a casing composition having a sugar content between about 6% and about 20% and a medium wheat flour content of less than about 94% and
        (ii) a filling composition having a sugar content between about 60% and about 70% and a soybean oil content of less than about 55%;
    (b) feeding simultaneously said casing composition into a twin screw cooker-extruder and said filling composition to an extruder die plate;
    (c) coextruding simultaneously through said die plate attached to a cooker-extruder barrel, a crisp external cookie-like casing by continuous extrusion cooking of said casing composition at a temperature between about 140° C. and about 190° C. and a soft internal cream filling by continuous extrusion of said filling composition at a temperature above a melting point of the composition and below a temperature between about 90° F. and about 100° F. whereby a coextruded product is formed; and
    (d) machining said coextruded product into pieces, said machining includes flattening and cutting said coextruded product to form oval tubular shaped pieces.

* * * * *